United States Patent [19]

Spiegelberg

[11] 4,447,933

[45] May 15, 1984

[54] GUT CASING HOLDING NOZZLE FOR A SAUSAGE FILLING MACHINE

[75] Inventor: Ulf Spiegelberg, Niederwil, Switzerland

[73] Assignee: C. Hoegger & Cie. AG., Gossau, Switzerland

[21] Appl. No.: 362,197

[22] Filed: Mar. 26, 1982

[30] Foreign Application Priority Data

Apr. 13, 1981 [CH] Switzerland ............... 2448/81

[51] Int. Cl.³ ............................................. A22C 11/00
[52] U.S. Cl. ........................................................ 17/41
[58] Field of Search .................. 17/41, 42; 426/512, 426/513, 516

[56] References Cited

U.S. PATENT DOCUMENTS 3,724,030  4/1973  Rassbach et al. .............. 17/41

FOREIGN PATENT DOCUMENTS 2203695  8/1973  Fed. Rep. of Germany ......... 17/41
1358487  7/1974  United Kingdom ............... 17/42

Primary Examiner—Willie G. Abercrombie
Attorney, Agent, or Firm—Sughrue, Mion, Zinn, Macpeak and Seas

[57] ABSTRACT

A gut casing holding nozzle includes a rotating fill tube 1 with a gut casing holding element 4 on its end. This is surrounded by a conical section 5, which is mounted in a mounting 8. Between the conical section 5 and the gut casing holding element 4 there is an annular slot for th gut casing to pass through. The conical section 5 is attached to the mounting 8 with radial and axial play, with the mounting 8 able to rotate. Two anchoring pins 13 attached to the mounting 8 are inserted into cavities 14 in the conical section 5, so as to cause that piece to rotate along with the mounting. In so doing automatic centering of the conical section 5 as compared to the fill tube 1 is guaranteed. Even out-of-round conditions in the fill tube or variations in gut casing wall thicknesses are compensated for automatically. The gut casing holding device is suited for high speed work conditions.

5 Claims, 2 Drawing Figures

GUT CASING HOLDING NOZZLE FOR A SAUSAGE FILLING MACHINE

BACKGROUND OF THE INVENTION

This invention concerns a gut casing holding device for a sausage filling machine.

Various systems are known for holding the gut casing in place, whether it be natural or manufactured casing material, on the fill tube of a sausage filling machine during the filling process so as to control the plumpness of the sausage being made. These systems utilize an elastic ring or similar object to hold the casing in place. These so-called casing holders also serve to prevent the casing from sliding or twisting on the fill tube while the sausage is being pressed to fill the casing. The casing holding ring exerts a radial pressure on the casing as it passes through, at which point it is very important for the ring to be exactly centered and capable of adjusting to variances in casing quality. Even minor inequalities in centering can lead to damage to the casing.

One casing holding ring using an elastic lip and revolving at the same time as the fill tube is known from German Pat No. 1,532,033. The width of the lip of the casing holding ring is narrower than the opening radius of the fill tube, and the alignment of the ring opening for the passage of the casing occurs by means of a sideward movement of the casing holding ring relative to the fill tube. An automatic centering of the fill tube is not possible.

Another configuration of a casing holding device is set forth in German Pat. No. 1,111,530. A ring slot for the casing is situated between a cone on the end of the fill tube and an opposing concave cone. This opposing cone is mounted on a tube that surrounds the fill tube, and is situated on a diagonal section that can slide forward and backward under the inertia produced by rotation and pressing in such a manner that the ring slot closes on its own, resulting in the sausage casing being held tightly in position until the pressing is finished, at which time the ring slot opens again on its own. This device is also incapable of automatic centering.

One final casing holding device is described in German Pat. No. 2,203,695 that is radially flexible relative to the fill tube and that is axially immobile. Neither the fill tube nor the casing holding element are able to rotate. The floating mount of the casing holding element is intended to achieve automatic self-centering under all operating conditions.

The aforementioned casing holding devices all have disadvantages of one sort or another. None of them are suited for high working speeds because they place too much of a strain on the casing and do not allow enough control in gently releasing their hold on the casing. This makes their highest working speeds more dependent on the type of sausage casing used, rather than on the actual speed at which the machine is capable of operating, whether it be a filling machine, portion sizer or sausage press controller.

It is especially when dealing with fill tubes of narrow diameters and relatively minimal wall strengths that irregularities and bends can occur due to careless handling on the part of the operating personnel. The casing holding device is equipped with a floating mounted outer lip in accordance with German Pat. No. 2,203,695. But since this outer lip does not rotate, an exactly centered passage of the sausage casing between the fill tube and the outer lip is not possible, which unavoidably leads to a partial overloading of the casing, and could even lead to its rupturing under high speed operating conditions. A rotational mounting of the casing holding device according to German Pat. No. 2,203,695 would not help because this type of device is too heavy and consists of too many pieces to be suitable for a rotating construction. Its centrifugal force would be greater than the counterforce that would be generated by an out-of-round fill tube as it rotated.

SUMMARY OF THE INVENTION

It is the object of this invention to provide a gut casing holding nozzle which will overcome these disadvantages. The specific aim is to achieve an automatic centering capability under even high speed operation and with possible out-of-round or bent fill tubes that will still provide for careful and controllable handling of the gut casing.

BRIEF DESCRIPTION OF THE DRAWINGS

On the basis of the technical drawings a detailed explanation of the invention is provided. In the drawings.

DETAILED DESCRIPTION OF THE PREFERRED EMBODIMENT

Figure 1:
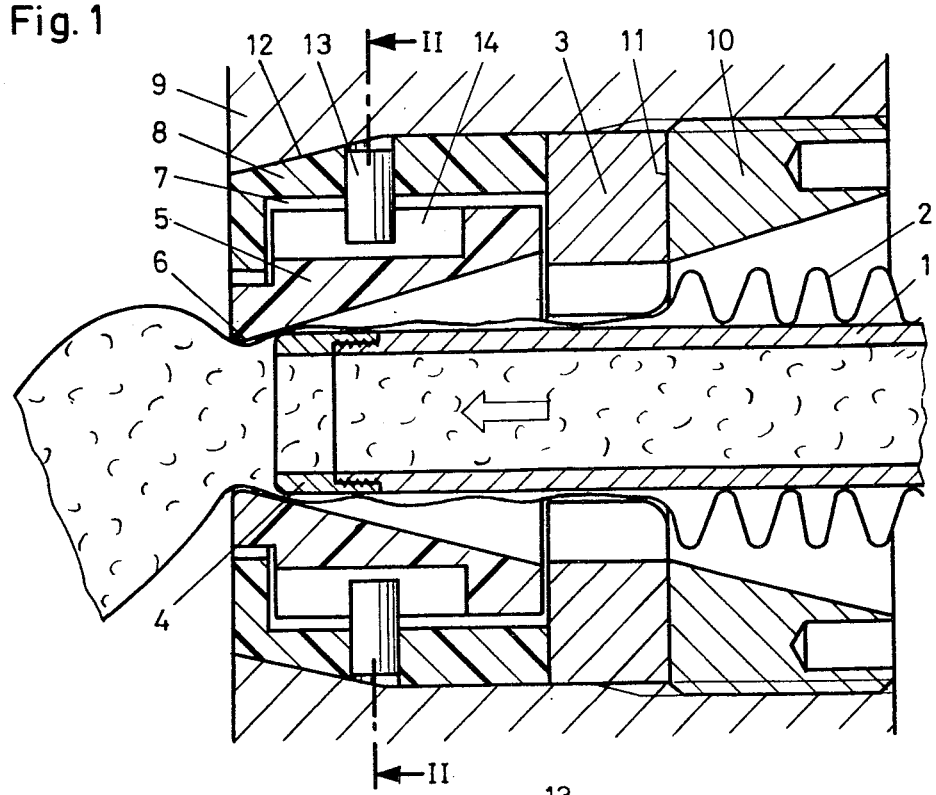
FIG. 1 shows a longitudinal cross-section of a fill tube of a sausage filling machine with mounting and a self-centering gut casing holding device.
Figure 2:
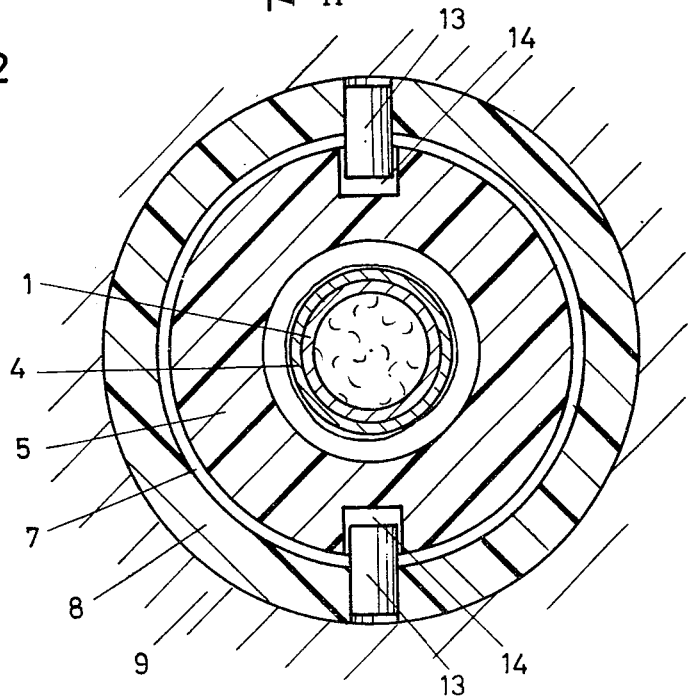
FIG. 2 shows an axial cross-section of the fill tube taken from lines II to II in FIG. 1.

The rotatable fill tube of a sausage filling machine (not further illustrated) as designated by the number 1. This fill tube is covered by a gut casing 2, which is loosely lying in folds. These folds are smoothed out by a mounting plate 3, which is lightly resting on the outer surface of the casing.

A cylindrical casing holding element 4 is screwed onto the end of the fill tube 1. This casing holding element is surrounded by a conical section or nozzle member 5, whereby an angular or cylindrical slot 7 is created in the space between a mounting member 8 and the conical section 5. This slot serves to center the potentially out-of-round and rotating fill tube.

The conical section 5 is externally cylindrical and has a conical inner side facing the casing 2. The end 6 of the conical section 5 extends beyond the end of the casing holding element 4 and its narrowest section is smaller than the outer diameter of the casing holding element.

The freely non-rotatable conical section 5 is made of plastic and is float mounted in a cylindrical cavity in the mounting member 8, which itself is non-rotatably mounted in a toothed holding box 9. A pressure ring 10 that is screwed into the toothed box 9 presses its frontal surface 11 against plate 3 which is also situated in the box 9, resulting in the plate 3 being pressed against the mounting member 8, with its conical, sloped surface 12 being pressed against a corresponding seat in box 9.

This holding box 9 is power-driven by means of a cogwheel or similar device so that it rotates simultaneously with the fill tube 1. Two anchoring pins 13 attached to the mounting member 8 loosely engage two longitudinal recesses 14 of the conical section 5 so that this section rotates along with the mounting 8.

Compared to the mounting member 8 and the anchoring pins 13, the conical section 5 has a certain amount of radial play. Compared to the mounting plate 3 a certain amount of axial play exists. Due to this relatively loose mounting of the conical section 5, automatic centering on the rotating fill tube can be guaranteed. Due to the lightweight construction of the conical section (5), the centrifugal force generated is minimal, which allows for higher working speeds. The holding device is also capable of overcoming inconsistencies and inequalities, which come into being due to bent fill tubes occasionally. Even the frequently encountered inconsistencies in artificial casing thicknesses can be equalized.

I claim:

1. A gut casing holding nozzle for a sausage filling machine, comprising:
   (a) a rotatable fill tube (1),
   (b) a gut casing holding element (4) attached to an outlet end of the tube,
   (c) a nozzle member (5) having a conical interior surface surrounding the holding element to define therewith an annular slot for the passage of a gut casing,
   (d) a mounting member (8) disposed surrounding the nozzle member and defining a cylindrical gap (7) therebetween,
   (e) at least two spaced cavities (14) defined in the outer surface of the nozzle member, and
   (f) at least two anchoring pins (13) extending inwardly from the mounting member and loosely disposed in the nozzle member cavities, whereby the nozzle member is "float mounted" within the mounting member with a predetermined degree of both radial and axial play to thereby enable the nozzle member to automatically center itself during operation to compensate for fill tube bends, casing irregularities, and the like.

2. Nozzle in accordance with claim 1, wherein the mounting member (8) is attached internally to a rotatably driven holding box (9).

3. Nozzle in accordance with claim 2, wherein the mounting member (8) is pressed against a conical seating surface (12) of the holding box (9) by a pressure ring (10).

4. Nozzle in accordance with claim 3, wherein a mounting plate (3) for smoothing folds in the gut casing (2) is positioned between the mounting member (8) and the pressure ring (10).

5. Nozzle in accordance with claim 1, wherein the cavities (14) in the nozzle member (5) are diametrically opposite each other, and serve as axial positioners for the anchoring pins (13).

* * * * *